(12) United States Patent
Nakao et al.

(10) Patent No.: US 12,319,017 B2
(45) Date of Patent: Jun. 3, 2025

(54) METHOD FOR MANUFACTURING SMC (71) Applicant: Mitsubishi Chemical Corporation, Tokyo (JP)

(72) Inventors: Hiroyuki Nakao, Tokyo (JP); Yasushi Watanabe, Tokyo (JP); Tadao Samejima, Tokyo (JP); Yukihiro Mizutori, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 240 days.

(21) Appl. No.: 17/946,395

(22) Filed: Sep. 16, 2022

(65) Prior Publication Data
US 2023/0021189 A1 Jan. 19, 2023

Related U.S. Application Data

(63) Continuation of application No. PCT/JP2021/010601, filed on Mar. 16, 2021.

(30) Foreign Application Priority Data

Mar. 26, 2020 (JP) ................. 2020-056724

(51) Int. Cl.
*B29C 70/50* (2006.01)
*B29C 70/12* (2006.01)
(Continued)

(52) U.S. Cl.
CPC ............ *B29C 70/508* (2013.01); *B29C 70/12* (2013.01); *B29C 70/18* (2013.01); *B29C 70/545* (2013.01);
(Continued)

(58) Field of Classification Search
CPC .......... D02J 1/18; B29C 70/12; B29C 70/508; B29C 70/502; B29C 70/545; B29C 70/18
See application file for complete search history.

(56) References Cited

U.S. PATENT DOCUMENTS

2012/0213997 A1   8/2012   Wang et al.
2015/0147543 A1*  5/2015   Guha .................. B32B 5/26
                                              252/182.13
(Continued)

FOREIGN PATENT DOCUMENTS

CN   109414886 A   3/2019
CN   114981054 A   8/2022
(Continued)

OTHER PUBLICATIONS

International Search Report issued in related International Patent Application No. PCT/JP2021/010601 dated May 18, 2021.
(Continued)

*Primary Examiner* — John J DeRusso
(74) *Attorney, Agent, or Firm* — Morgan, Lewis & Bockius LLP (57) ABSTRACT

A manufacturing method of an SMC of the present invention comprises (i) forming chopped carbon fiber bundles by chopping a continuous carbon fiber bundle having a filament number of NK with a rotary cutter, (ii) fragmentation-processing the chopped carbon fiber bundles by using a fragmentation-processing apparatus comprising a rotating body, (iii) forming a carbon fiber mat by depositing the fragmentation-processed chopped carbon fiber bundles on a carrier film traveling below the rotary cutter, and (iv) impregnating the carbon fiber mat with a thermosetting resin composition, wherein N is 20 or more, and the fragmentation-processing apparatus comprises a first pin roller and a second pin roller which are disposed side by side, each having a rotation axis parallel to a rotation axis direction of the rotary cutter.

18 Claims, 8 Drawing Sheets

(51) Int. Cl.
    *B29C 70/18*  (2006.01)
    *B29C 70/54*  (2006.01)
    *B29K 21/00*  (2006.01)
    *B29K 307/04* (2006.01)
    *B29L 7/00*   (2006.01)
    *C08J 5/04*   (2006.01)
    *C08J 5/24*   (2006.01)
    *D02J 1/18*   (2006.01)

(52) U.S. Cl.
    CPC .............. *C08J 5/042* (2013.01); *C08J 5/243* (2021.05); *D02J 1/18* (2013.01); *B29K 2021/006* (2013.01); *B29K 2307/04* (2013.01); *B29L 2007/002* (2013.01)

(56) References Cited

U.S. PATENT DOCUMENTS

| | | |
|---|---|---|
| 2019/0153632 A1 | 5/2019 | Motohashi et al. |
| 2019/0161890 A1 | 5/2019 | Motohashi et al. |
| 2019/0177887 A1 | 6/2019 | Motohashi et al. |
| 2020/0340146 A1 | 10/2020 | Kawahara et al. |
| 2022/0176647 A1* | 6/2022 | Yamanaka .............. B29C 70/42 |
| 2022/0347890 A1 | 11/2022 | Mizutori et al. |
| 2023/0020921 A1 | 1/2023 | Watanabe et al. |

FOREIGN PATENT DOCUMENTS

| | | |
|---|---|---|
| CN | 115298006 A | 11/2022 |
| JP | H04-135713 A | 5/1992 |
| JP | H05-004246 A | 1/1993 |
| JP | H05-042537 A | 2/1993 |
| JP | 2000-017557 A | 1/2000 |
| JP | 2018-187862 A | 11/2018 |
| WO | 2017/221655 A1 | 12/2017 |
| WO | 2017/221688 A1 | 12/2017 |
| WO | 2017/221658 A1 | 4/2019 |
| WO | 2019/142851 A1 | 7/2019 |
| WO | 2021/149578 A1 | 7/2021 |
| WO | 2021/187346 A1 | 9/2021 |

OTHER PUBLICATIONS

Extended European Search Report issued in related European Patent Application No. 21776330.9 dated Jul. 28, 2023.
Office Action issued in corresponding Japanese Patent Application No. 2022-509977, dated Mar. 11, 2025.
Office Action issued in corresponding Chinese Patent Application No. 202180023265.1, dated Mar. 8, 2025.

* cited by examiner

METHOD FOR MANUFACTURING SMC

This application is a continuation application of International Application No. PCT/JP2021/010601, filed on Mar. 16, 2021, which claims the benefit of priority of the prior Japanese Patent Application No. 2020-056724, filed Mar. 26, 2020, the contents of which are incorporated herein by reference.

TECHNICAL FIELD

The present invention relates to a manufacturing method of an SMC (sheet molding compound), and particularly relates to a manufacturing method of a CF-SMC which is an SMC using carbon fiber (CF).

BACKGROUND ART

In recent years, CFRP (carbon fiber reinforced plastic) which is a composite material comprising a carbon fiber and a resin has been widely used for components of aircraft, automobiles, ships, and other various transportation equipment, sports goods, and leisure goods.

A certain type of CFRP products is molded from the CF-SMC using a compression molding method.

The CF-SMC is a type of carbon fiber prepreg, and has a structure in which a mat comprising chopped carbon fiber bundles (also referred to as a "chopped carbon fiber tow" or a "chopped carbon fiber strand") is impregnated with a thermosetting resin composition.

The CFRP has higher strength when being reinforced with a carbon fiber bundle having a smaller filament number. On the other hand, the carbon fiber bundle requires a higher manufacturing cost when having a smaller filament number (smaller tow size) (Patent Document 1).

It is proposed adding a step of partially splitting a continuous carbon fiber bundle unwound from a creel before chopping to an SMC manufacturing method in which steps are continuously performed from chopping of the continuous carbon fiber bundle to resin impregnation of a carbon fiber mat (Patent Document 2).

There is an example in which chopped carbon fiber bundles having a fiber length of 12.6 mm cut out from a continuous carbon fiber bundle having a filament number of 50 K are brought into contact with a striking mechanism, divided into a plurality of pieces, and thereafter, used for forming a carbon fiber mat (Patent Document 3).

CITATION LIST

Patent Documents

[Patent Document 1]
United States Patent Application, Publication No. 2012/0213997
[Patent Document 2]
PCT International Publication No. WO 2017/221655
[Patent Document 3]
PCT International Publication No. WO 2019/142851

SUMMARY OF INVENTION

Technical Problem

The main purpose of the present invention is to provide a useful improvement in a method for manufacturing a CF-SMC from a continuous carbon fiber bundle having a large filament number, typically such as a large tow.

Solution to Problem

A preferred embodiment of the present invention includes the followings, but is not limited thereto.

[1] A manufacturing method of an SMC, comprising:
(i) forming chopped carbon fiber bundles by chopping a continuous carbon fiber bundle having a filament number of NK with a rotary cutter;
(ii) fragmentation-processing the chopped carbon fiber bundles by using a fragmentation-processing apparatus comprising a rotating body;
(iii) forming a carbon fiber mat by depositing the fragmentation-processed chopped carbon fiber bundles on a carrier film traveling below the rotary cutter; and
(iv) impregnating the carbon fiber mat with a thermosetting resin composition,
wherein N is 20 or more, and
the fragmentation-processing apparatus comprises a first pin roller and a second pin roller which are disposed side by side, each having a rotation axis parallel to a rotation axis direction of the rotary cutter.
[2] The manufacturing method according to [1],
wherein the first pin roller is rotationally driven such that its pins move downward from above on its side facing the second pin roller, and the second pin roller is rotationally driven such that its pins move downward from above on its side facing the first pin roller.
[3] The manufacturing method according to [1] or [2],
wherein a sum of a maximum radius of the first pin roller and a maximum radius of the second pin roller is equal to or greater than a distance between rotation axes of the first pin roller and the second pin roller.
[4] The manufacturing method according to [3],
wherein the sum of the maximum radius of the first pin roller and the maximum radius of the second pin roller is greater than the distance between the rotation axes of the first pin roller and the second pin roller.
[5] The manufacturing method according to [1] or [2],
wherein a sum of a maximum radius of the first pin roller and a maximum radius of the second pin roller is smaller than a distance between rotation axes of the first pin roller and the second pin roller, and a difference therebetween is 10 mm or less.
[6] The manufacturing method according to [1] to [5],
wherein N is 40 or more, 45 or more, or 50 or more.
[7] The manufacturing method according to [1] to [6],
wherein N is 100 or less, 75 or less, 60 or less, or 55 or less.
[8] The manufacturing method according to [1] to [7],
wherein the continuous carbon fiber bundle is a continuous carbon fiber bundle partially split into n sub-bundles (where, n is an integer of 2 or more) such that N/n is 10 to 25.
[9] The manufacturing method according to [8],
wherein N/n is 10 to 20 or 10 to 15.
[10] The manufacturing method according to [1] to [9],
wherein a content of a chopped carbon fiber bundle having a filament number of 1K or less in the carbon fiber mat is less than 1% by weight.
[11] The manufacturing method according to [1] to [10],
wherein the carbon fiber mat is pressurized together with the thermosetting resin composition to impregnate the carbon fiber mat with the thermosetting resin composition.

[12] The manufacturing method according to [1] to [11], wherein at least a part of the thermosetting resin composition is applied to an upper surface of the carrier film before the carbon fiber mat is formed on the carrier film.

[13] A manufacturing method of an SMC, comprising:
(i) forming chopped carbon fiber bundles by chopping a continuous carbon fiber bundle having a filament number of NK with a rotary cutter;
(ii) fragmentation-processing the chopped carbon fiber bundles by using a fragmentation-processing apparatus comprising a rotating body;
(iii) forming a carbon fiber mat by depositing the fragmentation-processed chopped carbon fiber bundles on a carrier film traveling below the rotary cutter; and
(iv) impregnating the carbon fiber mat with a thermosetting resin composition,
wherein the continuous carbon fiber bundle is a continuous carbon fiber bundle partially split into n sub-bundles (where, n is an integer of 2 or more) such that N/n is 10 to 25.

[14] The manufacturing method according to [13], wherein a content of a chopped carbon fiber bundle having a filament number of 1K or less in the carbon fiber mat is less than 1% by weight.

[15] The manufacturing method according to [13] or [14], wherein if the continuous carbon fiber bundle were not split, a content of the chopped carbon fiber bundle having a filament number of 1K or less in the carbon fiber mat is less than 0.1% by weight.

[16] The manufacturing method according to [13] to [15], wherein N is 40 or more.

[17] The manufacturing method according to [13] to [16], wherein N/n is 10 to 20 or 10 to 15.

[18] The manufacturing method according to [13] to [17], wherein the rotating body is a pin roller having a rotation axis parallel to a rotation axis of the rotary cutter.

[19] The manufacturing method according to [13] to [18], wherein the fragmentation-processing apparatus comprising a first pin roller and a second pin roller which are disposed side by side, each having a rotation axis parallel to a rotation axis of the rotary cutter.

[20] The manufacturing method according to [19], wherein the first pin roller is rotationally driven such that its pins move downward from above on its side facing the second pin roller, and the second pin roller is rotationally driven such that its pins move downward from above on its side facing the first pin roller.

[21] The manufacturing method according to [19] or [20], wherein a sum of a maximum radius of the first pin roller and a maximum radius of the second pin roller is equal to or greater than a distance between rotation axes of the first pin roller and the second pin roller. [22] The manufacturing method according to [21], wherein the sum of the maximum radius of the first pin roller and the maximum radius of the second pin roller is greater than the distance between the rotation axes of the first pin roller and the second pin roller.

[23] The manufacturing method according to [19] or [20], wherein a sum of a maximum radius of the first pin roller and a maximum radius of the second pin roller is smaller than a distance between rotation axes of the first pin roller and the second pin roller, and a difference therebetween is 10 mm or less.

[24] The manufacturing method according to [13] to [17], wherein the rotating body has a rotation axis parallel to a rotation axis of the rotary cutter, and has a structure in which a pair of disks are connected by a plurality of wires or rods.

[25] The manufacturing method according to [13] to [24], wherein the carbon fiber mat is pressurized together with the thermosetting resin composition to impregnate the carbon fiber mat with the thermosetting resin composition.

[26] The manufacturing method according to [13] to [25], wherein at least a part of the thermosetting resin composition is applied to an upper surface of the carrier film before the carbon fiber mat is formed on the carrier film.

[27] A processing method for a carbon fiber bundle, the method comprising:
fragmentation-processing chopped carbon fiber bundles with a fragmentation-processing apparatus in which a first pin roller and a second pin roller having rotation axes parallel to each other are disposed side by side.

[28] A fragmentation-processing apparatus for chopped carbon fiber bundles,
wherein a first pin roller and a second pin roller having rotation axes parallel to each other are disposed side by side.

[29] Use of a fragmentation-processing apparatus in which a first pin roller and a second pin roller having rotation axes parallel to each other are disposed side by side in fragmentation-processing chopped carbon fiber bundles.

Advantageous Effects of Invention

According to the present invention, there is provided a useful improvement in a manufacturing method of a CF-SMC from a continuous carbon fiber bundle having a large filament number, typically such as a large tow.

DESCRIPTION OF EMBODIMENTS

1. Manufacturing Method of SMC

One embodiment of the invention relates to an SMC manufacturing method.

The SMC manufacturing method of the present embodiment comprises the following steps (i) to (iv).
 (i) A step of chopping a continuous carbon fiber bundle having a filament number of NK with a rotary cutter into chopped carbon fiber bundles.
 (ii) A step of fragmentation-processing the chopped carbon fiber bundles by using a fragmentation-processing apparatus having a rotating body.
 (iii) A step of depositing the fragmentation-processed chopped carbon fiber bundles on a carrier film traveling below the rotary cutter to form a carbon fiber mat.
 (iv) A step of impregnating the carbon fiber mat with a thermosetting resin composition.

Figure 1:
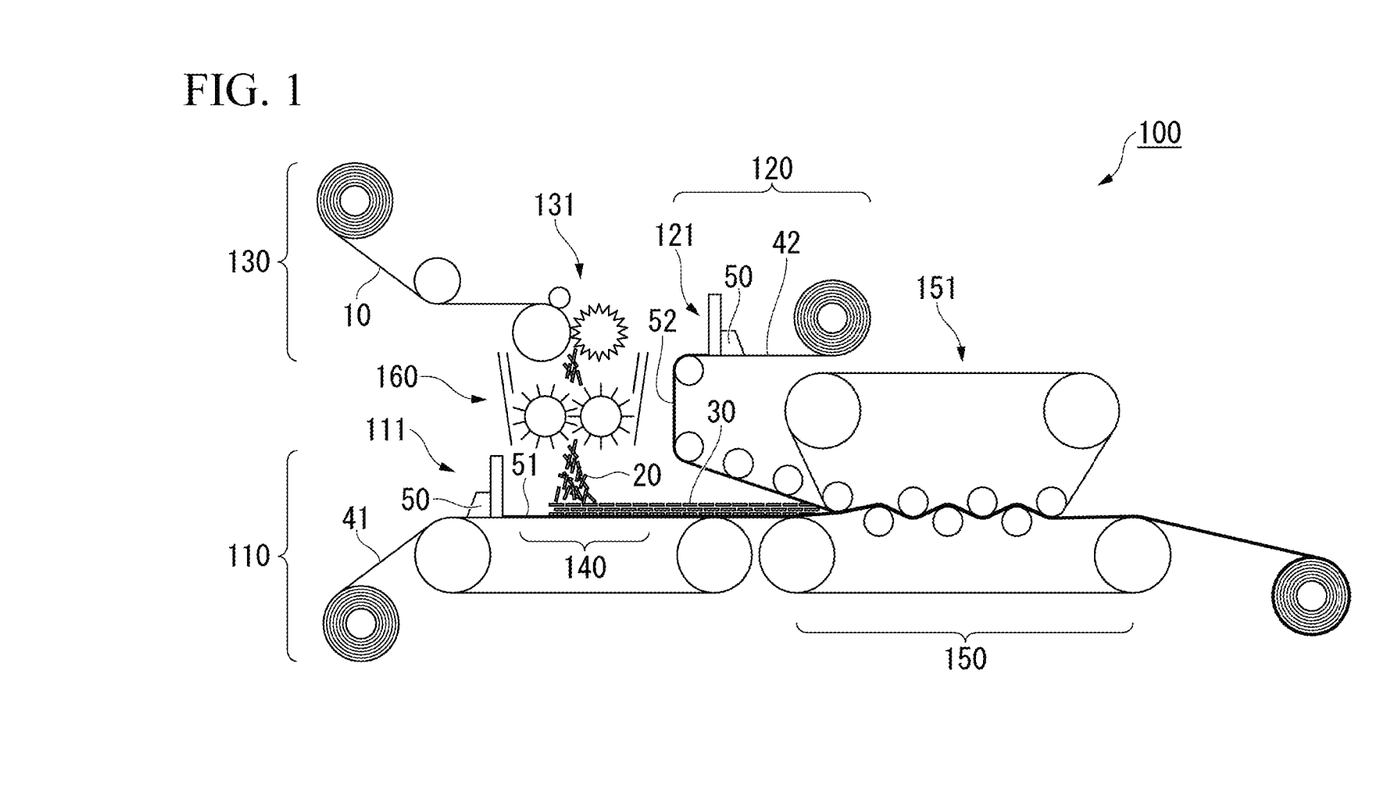
FIG. 1 is a conceptual diagram of an SMC manufacturing apparatus.

FIG. 1 represents a conceptual diagram of the SMC manufacturing apparatus that can be preferably used in the SMC manufacturing method comprising the above-described steps (i) to (iv).

Referring to FIG. 1, an SMC manufacturing apparatus 100 includes a first resin application section 110, a second resin application section 120, a chopping section 130, a deposition section 140, and an impregnation section 150. A fragmentation-processing apparatus 160 is disposed between the chopping section 130 and the deposition section 140.

The first resin application section 110 is provided with a first applicator 111 including a doctor blade to form a first resin layer 51 comprising a thermosetting resin composition 50 on a first carrier film 41 drawn out from a roll.

The second resin application section 120 is provided with a second applicator 121 including a doctor blade to form a second resin layer 52 comprising the same thermosetting resin composition 50 on a second carrier film 42 drawn out from the roll.

The chopping section 130 is provided with a rotary cutter 131 for chopping a continuous carbon fiber bundle 10 drawn out from a package.

Figure 2:
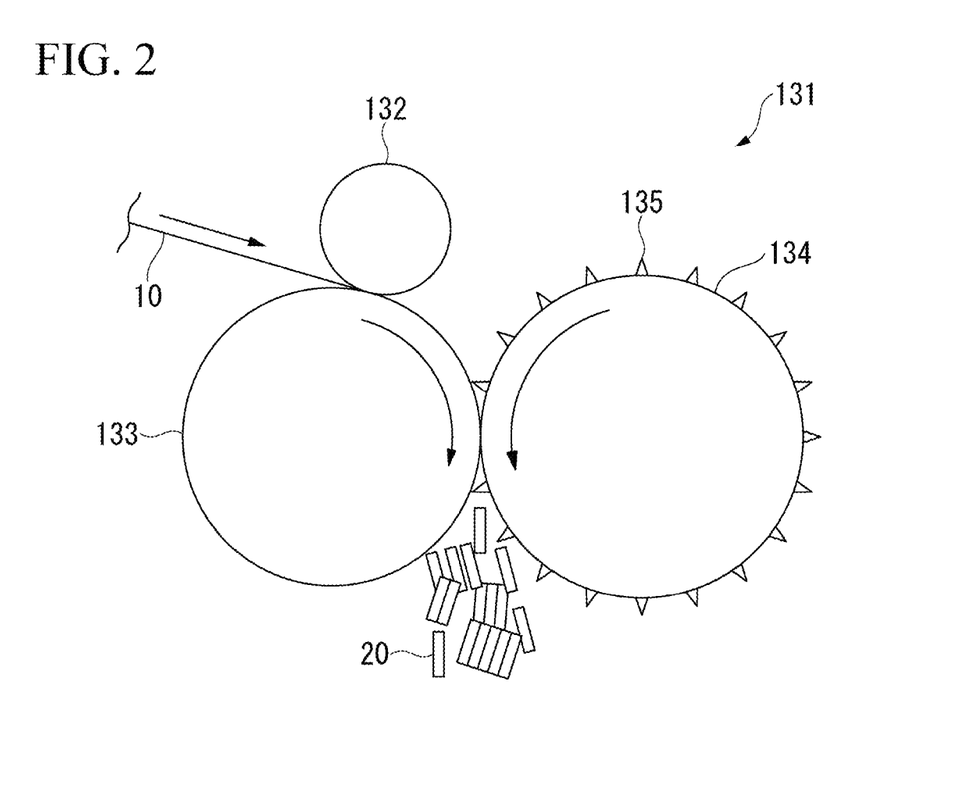
FIG. 2 is a schematic diagram of a rotary cutter.

As represented in FIG. 2, the rotary cutter 131 includes a guide roll 132, a pinch roll 133, and a cutter roll 134. A plurality of blades 135 are disposed on an outer circumference of the cutter roll 134 at a regular interval in a circumferential direction, so that chopped carbon fiber bundles 20 having constant fiber lengths can be cut out one after another from the continuous carbon fiber bundle 10.

Usually, a plurality of the continuous carbon fiber bundles 10 are aligned to be parallel to each other in a plane parallel to a rotation axis direction of the rotary cutter 131, and are supplied to the rotary cutter 131 at the same time.

The rotation axis direction of the rotary cutter 131 is a direction of a rotation axis of each roll provided in the rotary cutter 131, that is, a direction of a rotation axis of the cutter roll 134. Directions of the rotation axes of the guide roll 132 and the pinch roll 133 are also the same as the direction of the rotation axis of the cutter roll 134.

The deposition section 140 is disposed below the chopping section 130. The first carrier film 41 is conveyed from the first resin application section 110 to the impregnation section 150 via the deposition section 140. When the first carrier film 41 travels in the deposition section 140, the chopped carbon fiber bundles 20 produced in the chopping section 130 are fallen and deposited on the first resin layer 51 formed on a surface of the first carrier film 41, so that a carbon fiber mat 30 is formed.

A mechanism for gradually bringing the first carrier film 41 and the second carrier film 42 closer to each other is disposed in an upstream part of the impregnation section 150. An impregnation machine 151 is disposed in a main part of the impregnation section 150. In order that a laminate in which the carbon fiber mat 30 and the thermosetting resin composition 50 are sandwiched by the first carrier film 41 and the second carrier film 42 is conveyed by being sandwiched from above and below with two conveyor belts, the impregnation machine 151 includes two belt conveyors located above and below, and includes rollers for pressurizing the laminate by sandwiching it together with the conveyor belts.

Figure 3:
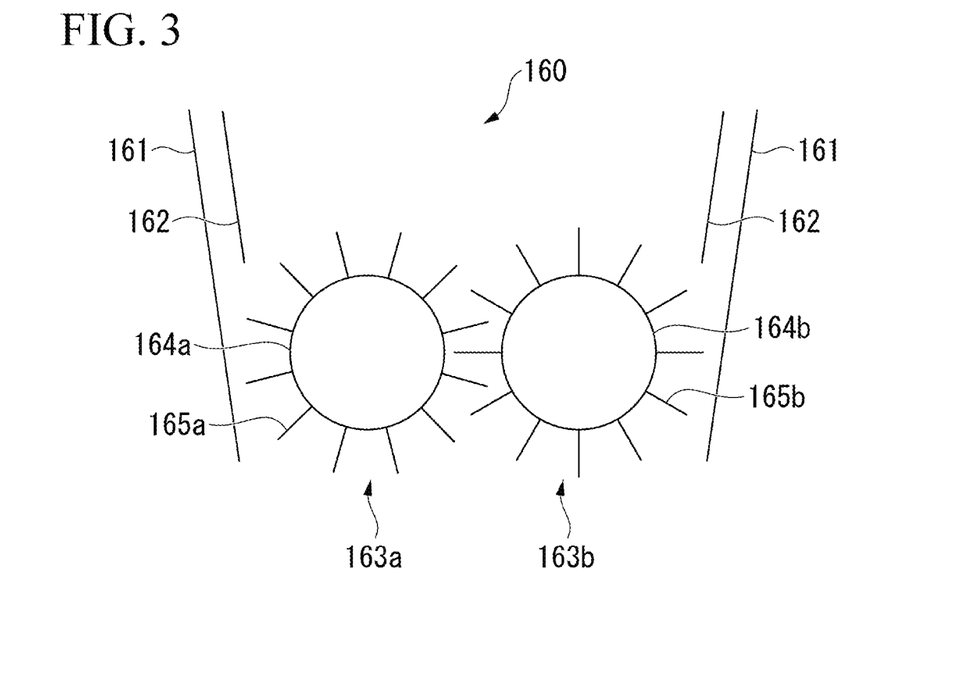
FIG. 3 is a schematic diagram of a fragmentation-processing apparatus.

As represented in FIG. 3, the fragmentation-processing apparatus 160 disposed between the chopping section 130 and the deposition section 140 includes a cover 161, a guide plate 162 and a pair of pin rollers (first pin roller 163a and second pin roller 163b) which are disposed inside the cover. The first pin roller 163a and the second pin roller 163b are disposed side by side, have substantially the same axial lengths, and have the rotation axes parallel to each other.

In the SMC manufacturing apparatus 100, the fragmentation-processing apparatus 160 is disposed such that the rotation axes of the first pin roller 163a and the second pin roller 163b are parallel to the rotation axis direction of the rotary cutter 131.

Figure 4:
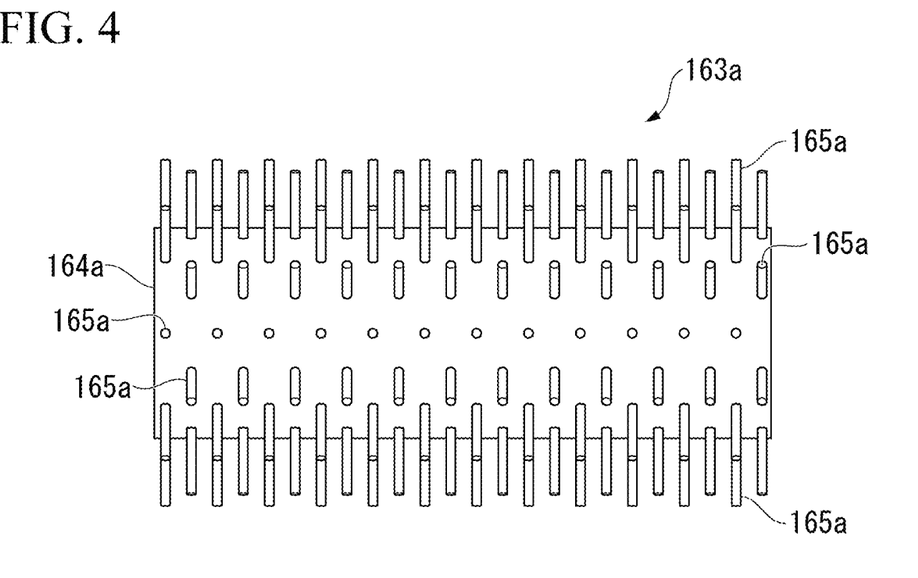
FIG. 4 is a schematic diagram of a pin roller provided in the fragmentation-processing apparatus.

Referring to FIG. 4, the first pin roller 163a has a cylinder 164a, and a plurality of pins 165a having the same shapes and the same dimensions are disposed on the surface thereof. Both the cylinder 164a and the pin 165a are rigid bodies, and are formed of metal, for example.

A diameter of the cylinder 164a is not limited to, but can be 60 mm to 150 mm, for example.

The pins 165a extend to be perpendicular to the rotation axis of the first pin roller 163a. Although not limited, the pins 165a have columnar shapes, for example. A boundary between an end surface and a circumferential surface may be chamfered in the pin 165a.

The diameter of the pin 165a is not limited to, but can be, for example, 1 mm to 5 mm.

The length of the pin 165a, that is, the distance from the tip to the root of the pin is not limited to, but can be, for example, 10 mm to 50 mm.

It is preferable that the pin 165a has a circular cross section to prevent fuzzing of the chopped carbon fiber bundles 20 processed by the fragmentation-processing apparatus 160. The pin 165a may have a shape of a cone or a truncated cone whose diameter decreases toward the tip.

It is preferable that disposition of the pins 165a on the circumferential surface of the cylinder 164a overlaps the original disposition when shifted by 5 mm to 20 mm in the axial direction and 4 mm to 30 mm in the circumferential direction.

Figure 5:
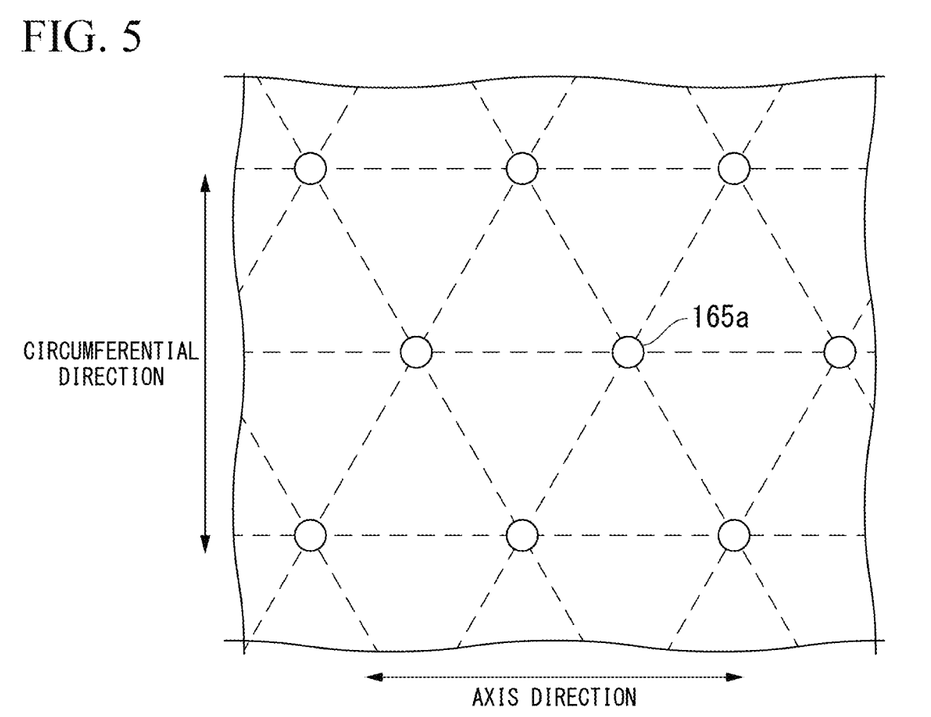
FIG. 5 represents a part of a plane-development of a cylinder circumferential surface of a pin roller.

For example, in a case of the pin roller 163a represented in FIG. 4, when the circumferential surface of the cylinder 164a is plane-developed, the pin 165a is disposed at each vertex of an equilateral triangle (indicated by a broken line) tessellating such that one side is parallel to the axial direction, as represented in FIG. 5. For example, when the length of one side of the equilateral triangle is 5 mm, the disposition of the pins 165a represented in FIG. 5 overlaps the original disposition when shifted by 2.5 mm in the axial direction and approximately 4.3 mm in the circumferential direction.

All with regard to the first pin roller 163a described above are also applied to the second pin roller 163b.

Although not limited, in order to reduce costs for designing, manufacturing, and maintaining the fragmentation-processing apparatus 160, it is preferable that in items as many as possible, including a maximum radius, a cylinder diameter, and shapes, dimensions, a number and a disposition of pins, designs and specifications of the first pin roller 163a and the second pin roller 163b coincide with each other.

In this specification, the maximum radius of the pin roller is defined as a distance from the rotation axis to the tip of the pin.

Figure 6:
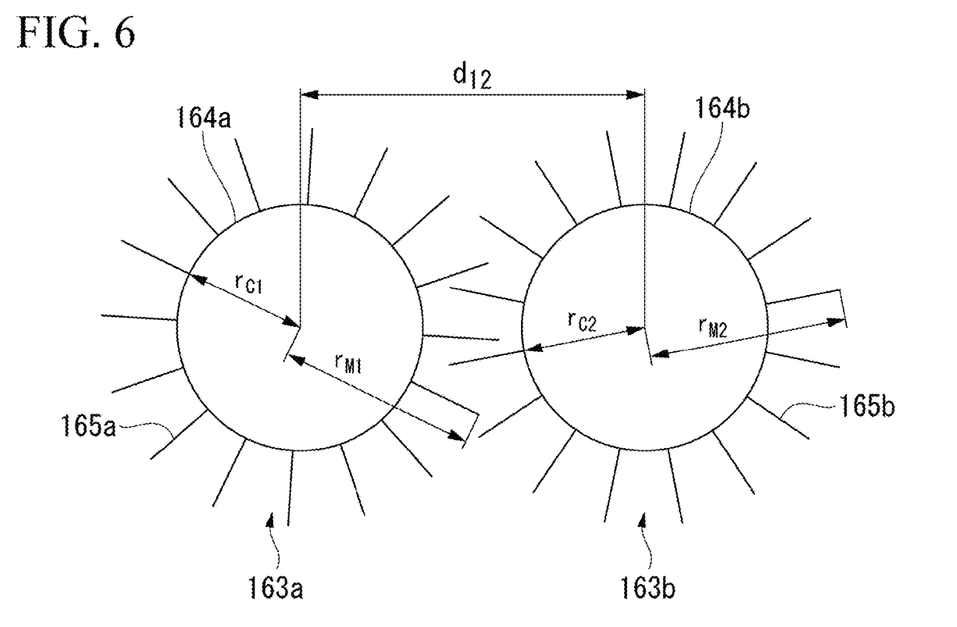
FIG. 6 is a schematic diagram representing a positional relationship between two pin rollers provided in a fragmentation-processing apparatus.

Referring to FIG. 6, the sum of a maximum radius $r_{M1}$ of the first pin roller 163a and a maximum radius $r_{M2}$ of the second pin roller 163b is larger than a distance $d_{12}$ between the rotation axes of the two pin rollers.

The sum of the maximum radius $r_{M1}$ of the first pin roller 163a and a radius $r_{C2}$ of the cylinder 164b of the second pin roller is smaller than the distance $d_{12}$ between the rotation axes of the two pin rollers. Similarly, the sum of the maximum radius $r_{M2}$ of the second pin roller 163b and a radius $r_{C1}$ of the cylinder 164a of the first pin roller is also smaller than the distance $d_{12}$ between the rotation axes of the two pin rollers.

A difference $\{(r_{M1}+r_{M2})-d_{12}\}$ between a sum of the maximum radius $r_{M1}$ of the first pin roller 163a and the maximum radius $r_{M2}$ of the second pin roller 163b and the distance $d_{12}$ between the rotation axes is not limited to, but may be 20 mm or less, 15 mm or less, 10 mm or less, or 5 mm or less.

The first pin roller 163a and the second pin roller 163b are rotationally driven by a drive mechanism (not represented). Rotation speeds of the first pin roller 163a and the second pin roller 163b may be independently controllable.

There is no limitation on the rotation directions of the first pin roller 163a and the second pin roller 163b. Therefore, the rotation direction of the first pin roller 163a and the rotation direction of the second pin roller 163b may be the same or opposite.

When the first pin roller 163a and the second pin roller 163b rotate in mutually opposite directions, the rotation mode may be inward rotation or outward rotation. The inward rotation means a mode in which each pin roller rotates such that its pins move downward from above on its side facing the other pin roller. On the other hand, the outward rotation means a mode in which each pin roller rotate such that its pins move upward from below on its side facing the other pin roller.

Rotating both the first pin roller 163a and the second pin roller 163b is advantageous in preventing the chopped carbon fiber bundles 20 from being clogged between the two pin rolls.

In a modified embodiment, in the fragmentation-processing apparatus 160, the sum of a maximum radius $r_{M1}$ of the first pin roller 163a and a maximum radius $r_{M2}$ of the second pin roller 163b may be equal to the distance $d_{12}$ between the rotation axes of the two pin rollers.

In another modified embodiment, in the fragmentation-processing apparatus 160, the sum of the maximum radius $r_{M1}$ of the first pin roller 163a and the maximum radius $r_{M2}$ of the second pin roller 163b may be slightly smaller than the distance $d_{12}$ between the rotation axes of the two pin rollers, in which a difference $\{d_{12}-(r_{M1}+r_{M2})\}$ therebetween is preferably 10 mm or less, and is more preferably 5 mm or less.

In another embodiment, the number of pin rollers provided in the fragmentation-processing apparatus may be one, or may be three or more.

Figure 10:
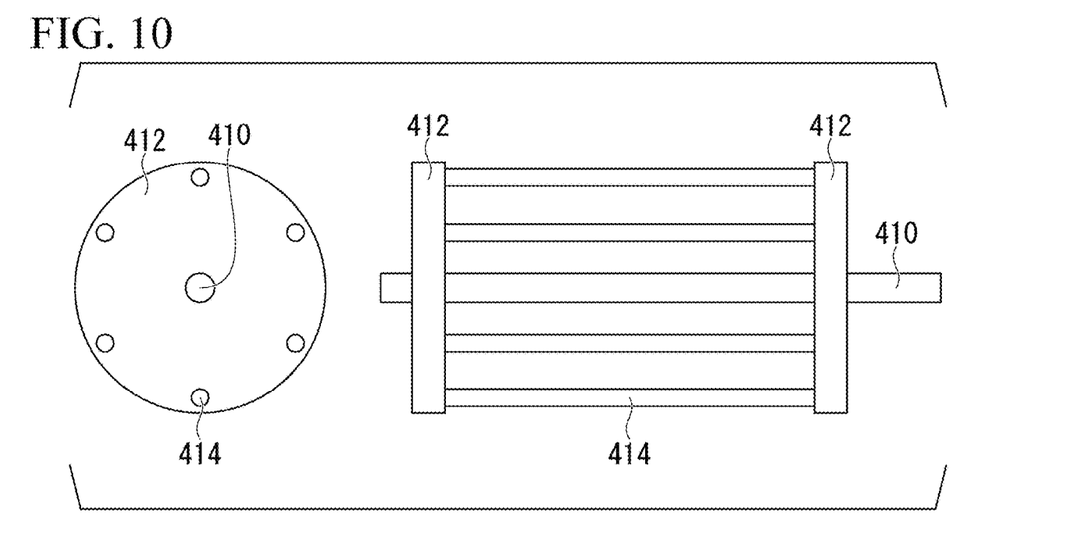
FIG. 10 is a schematic diagram representing an example of a rotating body of a fragmentation-processing apparatus.

In still another embodiment, the fragmentation-processing apparatus may be provided a rotating body other than a pin roller. An example of the rotating body having a structure in which a pair of disks are connected by a plurality of wires or rods as represented in FIG. 10.

In the SMC manufacturing method of the present embodiment, the continuous carbon fiber bundle having the filament number of NK is used as a carbon fiber raw material.

NK means N×1000. For example, a filament number of a carbon fiber bundle comprising 3,000 single fiber filaments is 3K, and the filament number of a carbon fiber bundle comprising 30,000 single fiber filaments is 30K.

The filament number of the continuous carbon fiber bundle used as a raw material in the SMC manufacturing method of the present embodiment is at least 20K, preferably 40K or more, more preferably 45K or more, and is much more preferably 50K or more.

The filament number of the continuous carbon fiber bundle used as a raw material in the SMC manufacturing method of the present embodiment is not limited to, but is usually 100K or less, and may be 75K or less, or 60K or less, 55K or less.

The abovementioned upper limits and lower limits can be arbitrarily combined. For example, the filament number of the continuous carbon fiber bundle used as a raw material in the SMC manufacturing method of the present embodiment is preferably 20K to 100K, more preferably 40K to 75K, much more preferably 45K to 60K, and is particularly preferably 50K to 55K.

Preferably, the continuous carbon fiber bundle used as a raw material in the SMC manufacturing method of the present embodiment is a continuous carbon fiber bundle partially split into the n-number (where, n is an integer of 2 or more) of sub-bundles such that N/n is 10 to 25. N/n is preferably 10 to 20, and is more preferably 10 to 15.

When it is said that the continuous carbon fiber bundle is partially split into n sub-bundles, it means, in other words, that the continuous carbon fiber bundle is partially divided into n parts. Each of the n fiber bundles formed by the division into n parts is called the sub-bundle.

Figure 7:
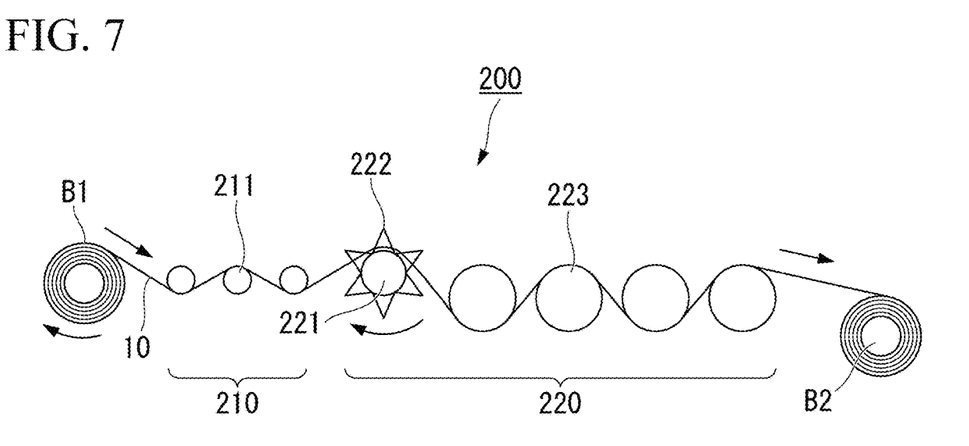
FIG. 7 is a conceptual diagram of a split device.

Although not limited, partially splitting of the continuous carbon fiber bundle can be conducted by using a split device represented in a conceptual diagram in FIG. 7, for example.

Referring to FIG. 7, the split device 200 comprises a spread section 210 and a split section 220.

A continuous carbon fiber bundle 10 serving as a starting material and having a filament number of NK is drawn out from a supply bobbin B1.

The continuous carbon fiber bundle 10 drawn out from the supply bobbin B1 before being split is first spread in the spread section 210.

A spreader bar 211 provided in the spread section 210 may be heated and may be caused to reciprocate in a width direction of the continuous carbon fiber bundle 10. Mechanism for these configurations can refer to a known technique.

While the continuous carbon fiber bundle 10 originally has a flat shape, it is further increased in width and further decreased in thickness by being rubbed against the spreader bar 211. The thickness of the continuous carbon fiber bundle 10 after passing through the spread section 210 is not limited to, but can be typically 0.2 mm when the filament number is 50K.

The spread section 210 may be omitted, when the continuous carbon fiber bundle 10 is sufficiently flat in a stage where the continuous carbon fiber bundle 10 is supplied from the supply bobbin B1. For example, a carbon fiber bundle having a bundle width of 50 times or more of an average thickness can be said to be sufficiently flat.

Next, the continuous carbon fiber bundle 10 is fed to the split section 220, and is partially split there.

The split section 220 is provided with a rotary blade 221 for forming a slit in the continuous carbon fiber bundle 10.

A rotation axis of the rotary blade 221 is parallel to a width direction of the continuous carbon fiber bundle 10 traveling in a fiber direction. A plurality of blade parts 222 are provided at a regular interval in a circumferential direction on an outer circumference of the rotary blade 221 so that slits having a constant length are intermittently formed at a regular interval along the fiber direction of the continuous carbon fiber bundle 10. A slit length and an inter-slit gap length can be controlled by adjusting a traveling speed of the continuous carbon fiber bundle 10, a circumferential speed of the rotary blade 221, and/or an interval between the blade parts 222.

The traveling speed of the continuous carbon fiber bundle 10 is controlled by a plurality of godet rolls 223.

The continuous carbon fiber bundle 10 is partially divided into n parts due to intermittent formation of slits along the fiber direction by the (n−1)-number of rotary blades 221 aligned in a direction parallel to the width direction of the traveling continuous carbon fiber bundle 10.

Figure 8A:
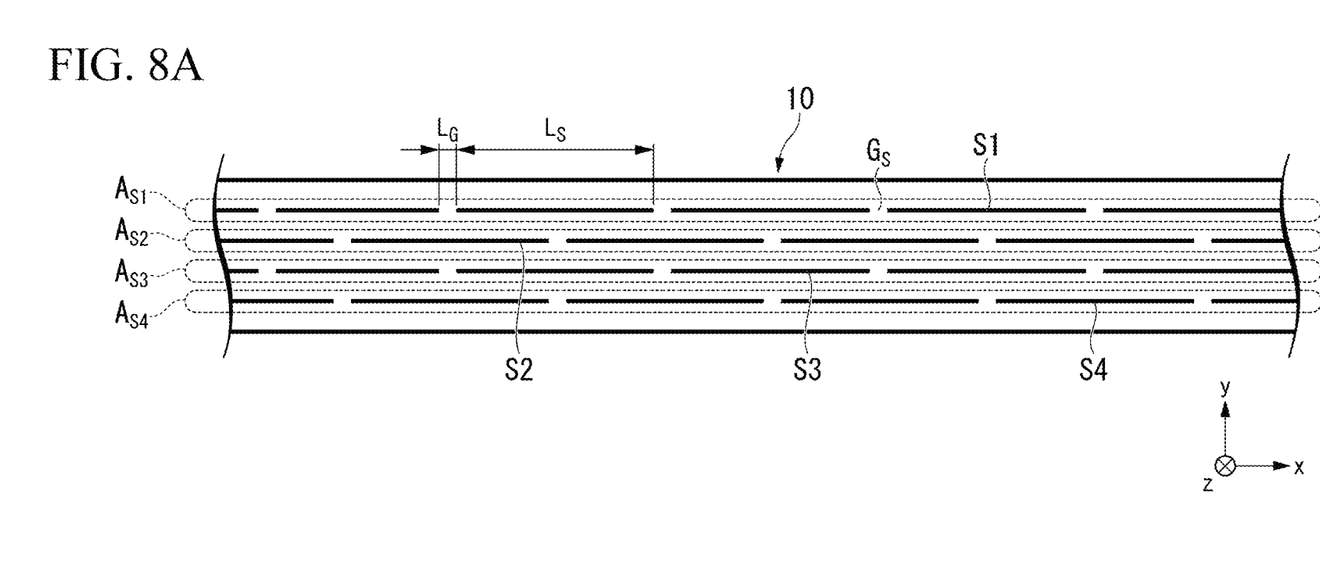
FIG. 8A is a plan view of a continuous carbon fiber bundle partially split into five parts viewed from a thickness direction.
Figure 8B:
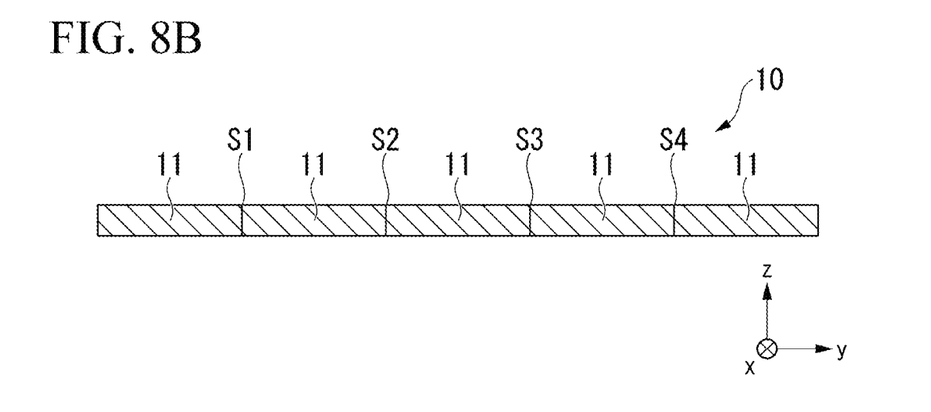
FIG. 8B is a sectional view of the continuous carbon fiber bundle partially split into five parts representing a cross section perpendicular to a fiber direction.

As an example, FIGS. 8A and 8B represent the continuous carbon fiber bundle 10 when n=5, that is, when partially divided into five parts by four rotary blades 221.

For convenience, when the fiber direction (longitudinal direction) of the continuous carbon fiber bundle 10 is defined as an x-direction, the width direction is defined as a y-direction, and the thickness direction is defined as a z-direction, FIG. 8A is a plan view when the continuous carbon fiber bundle 10 is viewed in the z-direction, and FIG. 8B represents a cross section perpendicular to the x-direction (a cross section when cut by a yz-plane) of the continuous carbon fiber bundle 10.

As represented in FIG. 8A, in the continuous carbon fiber bundle 10, four slit rows including a first slit row $A_{S1}$, a second slit row $A_{S2}$, a third slit row $A_{S3}$, and a fourth slit row $A_{S4}$ are formed.

The first slit row $A_{S1}$ comprises a plurality of first slits S1 aligned in the x-direction.

The second slit row $A_{S2}$ comprises a plurality of second slits S2 aligned in the x-direction.

The third slit row $A_{S3}$ comprises a plurality of third slits S3 aligned in the x-direction.

The fourth slit row $A_{S4}$ comprises a plurality of fourth slits S4 aligned in the x-direction.

The four slit rows are formed by different rotary blades, and therefore are different from each other in positions in the y-direction.

The slit length $L_S$ and the inter-slit gap length $L_G$ are constant in any of the slit rows, and are common also among different slit rows.

A ratio $L_S/(L_S+L_G)$ of the slit length $L_S$ to a sum of the slit length $L_S$ and the inter-slit gap length $L_G$ is usually 90% or higher and preferably 95% or higher and may be 99% for example. Therefore, as represented in FIG. 8B, the continuous carbon fiber bundle 10 is split into five sub-bundles 11 in most parts.

The positions of the first slit row $A_{S1}$, the second slit row $A_{S2}$, the third slit row $A_{S3}$, and the fourth slit row $A_{S4}$ in the y-direction are set so that the widths of the five sub-bundles 11 are approximately the same.

The slit length $L_S$ is not limited to, but preferably more than 25 mm, more preferably more than 50 mm, and much more preferably more than 500 mm. The slit length $L_S$ can be 10 times or more, further 20 times or more, and further 30 times or more a cutting length when the continuous carbon fiber bundle 10 is cut to manufacture the SMC.

For example, the slit length $L_S$ can be more than 25 mm and 50 mm or less, more than 50 mm and 100 mm or less, more than 100 mm and 200 mm or less, more than 200 mm and 500 mm or less, more than 500 mm and 1000 mm or less, more than 1000 mm and 1500 mm or less, more than 1500 mm and 2000 mm or less, or more than 2000 mm and 3000 mm or less.

The inter-slit gap length $L_G$ is not limited to, but for example, is 5 to 10 mm and may be less than 5 mm.

In an example represented in FIG. 8A, positions of inter-slit gaps $G_S$ are shifted in the x-direction between the first slit row $A_{S1}$ and the second slit row $A_{S2}$. The same applies to between the second slit row $A_{S2}$ and the third slit row $A_{S3}$, and between the third slit row $A_{S3}$ and the fourth slit row $A_{S4}$.

Figure 9:
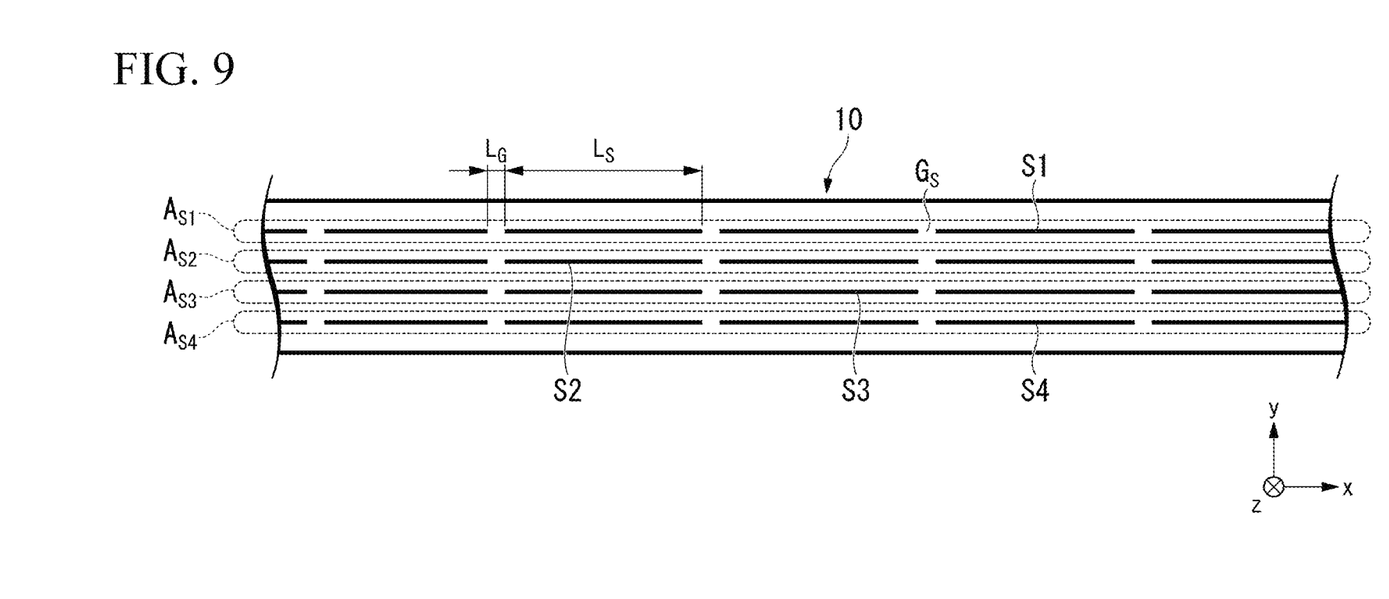
FIG. 9 is a plan view of a continuous carbon fiber bundle partially split into five parts viewed from a thickness direction.

Such a configuration with a shifting in the positions of the inter-slit gaps $G_S$ in the x-direction between adjacent slit rows is not essential. In one example, the positions of the inter-slit gaps $G_S$ may be aligned among all of the slit rows as represented in FIG. 9. In another example, the positions of the inter-slit gaps $G_S$ may be aligned among some of the slit rows and shifted in the x-direction among some other slit rows.

What is described above about the slit length $L_S$, the inter-slit gap length $L_G$, a ratio $L_S/(L_S+L_G)$ of the slit length $L_S$ to a sum of the slit length $L_S$ and the inter-slit gap length $L_G$, and the position of the inter-slit gap $G_S$ is not limited to a case of n=5, that is, a case where the continuous carbon fiber bundle 10 is partially split into the five sub-bundles, and the same applies to a case where the continuous carbon fiber bundle 10 is partially split into four sub-bundles or less or six sub-bundles or more.

Referring to FIG. 7 again, the continuous carbon fiber bundle 10 partially split into n parts in the split section 220 is wound on a take-up bobbin B2 to form a package, and thereafter, the package is used in the SMC manufacturing method according to the present embodiment. That is, the split device 200 is offline from the SMC manufacturing apparatus 100.

In another embodiment, the split device 200 may be connected inline to the SMC manufacturing apparatus 100. That is, the continuous carbon fiber bundle 10 partially split into the n parts by the split device 200 may be supplied to the chopping section 130 of the SMC manufacturing apparatus 100 without being wound on the bobbin even once.

When the continuous carbon fiber bundle 10 does not contain a sufficient amount of sizing agent, fuzzing is likely to occur when the continuous carbon fiber bundle 10 is partially split, and, in addition to that, the sub-bundles 11 formed by splitting tend to be fixed to each other. When the sub-bundles 11 are fixed to each other, an advantageous effect obtained by splitting the continuous carbon fiber bundle 10 is impaired, therefore, in such a case, before being partially split for example, it is desirable to supplement the sizing agent contained in the continuous carbon fiber bundle 10.

Supplementing the sizing agent in this stage is also effective in preventing generation of a large amount of excessively fine fragments when the fragmentation-processing is performed on the chopped carbon fiber bundle in a later step.

The partially split continuous carbon fiber bundle 10 is supplied to the chopping section 130 and cut one after another by the rotary cutter 131, thereby producing the chopped carbon fiber bundles 20 having predetermined fiber lengths. The produced chopped carbon fiber bundles 20 fall toward the fragmentation-processing apparatus 160 placed below the rotary cutter 131.

The fiber length of the chopped carbon fiber bundle 20 is not limited to, but can be 5 to 100 mm, preferably 20 to 60 mm, for example, and can be typically approximately 13 mm (0.5 inches), approximately 25 mm (1 inch), or approximately 50 mm (2 inches).

In the fragmentation-processing apparatus 160, at least some of the chopped carbon fiber bundles 20 falling from the rotary cutter 131 come into contact with at least one of the first pin roller 163a and the second pin roller 163b and are each divided into a plurality of fragments by an impact.

The fragmentation-processing is not intended for defibration. That is, the fragmentation-processing is not to loosen the chopped carbon fiber bundle into single fiber filaments or a state close to single fiber filaments. The chopped carbon fiber bundle having an excessively small filament number has low straightness, and does not have a sufficient reinforcing effect. The carbon fiber bundle having the filament number exceeding 1K easily maintains straightness, and has a relatively high reinforcing effect.

In the fragmentation-processing apparatus 160, the rotation direction of the first pin roller 163a and the second pin roller 163b and the circumferential speed at each pin tip are set so that a content of the chopped carbon fiber bundle having the filament number of 1K or less in the carbon fiber deposited on the first carrier film 41 is preferably less than 1% by weight.

When other conditions are the same, and when the first pin roller 163a and the second pin roller 163b are each rotationally driven such that its pins move downward from above on its side facing the other pin roller (inward rotation mode), the generation amount of fragments having the filament number of 1K or less decreases, compared to a case of adopting another rotation mode.

When other conditions are the same, as the circumferential speed is lower at the pin tips of each of the first pin roller 163a and the second pin roller 163b, the generation amount of fragments having the filament number of 1K or less decreases.

In a preferred example, the rotation directions of the first pin roller 163a and the second pin roller 163b and the circumferential speed at each pin tip may be set so that the content of the chopped carbon fiber bundle having the filament number of 1K or less in the carbon fibers deposited on the first carrier film 41 is less than 0.1% by weight if the continuous carbon fiber bundle 10 were supplied without being partially split.

The content of the sizing agent of the continuous carbon fiber bundle 10 may be increased to reduce the generation amount of fragments having a filament number of 1 K or less and fuzz.

In the inward rotation mode in which the first pin roller 163a and the second pin roller 163b are each rotationally driven such that its pins move downward from above on its side facing the other pin roller, substantially all of the chopped carbon fiber bundles 20 produced in the chopping section 130 are fallen to the deposition section through between the cylinder 164a of the first pin roller 163a and the cylinder 164b of the second pin roller 163b. As a result, since difference in falling positions of the chopped carbon fiber bundles 20 depending on bundle sizes is less likely to occur, even when a distribution of the bundle sizes of the chopped carbon fiber bundle 20 is wide, there is an advantage in that the carbon fiber mat 30 is likely to be uniform along the thickness direction.

The first resin layer 51 formed on the first carrier film 41 using the first applicator 111, and the second resin layer 52 formed on the second carrier film 42 using the second applicator 121 are comprised of the same thermosetting resin composition 50.

The thermosetting resin composition 50 is a fluid paste containing a thermosetting resin as a main component and in which a thickener and a curing agent are blended, and if necessary, additives such as a reactive diluent, a low shrinkage agent, a filler, and a flame retardant are blended.

Typical examples of the thermosetting resin are an epoxy resin, a vinyl ester resin, an unsaturated polyester resin, a polyimide resin, a maleimide resin and a phenol resin, and two or more types selected from these resins can be mixed and used.

Preferred thermosetting resins are the epoxy resin, the vinyl ester resin, and the unsaturated polyester resin in view of excellent adhesiveness to the carbon fiber.

With regard to a specific formulation of the thermosetting resin composition, a related art can be appropriately referred to.

The chopped carbon fiber bundles 20 processed by the fragmentation-processing apparatus 160 fall on the first carrier film 41 conveyed below the fragmentation-processing apparatus 160. The fallen chopped carbon fiber bundles 20 are deposited on the first resin layer 51 formed on a surface of the first carrier film 41, thereby forming the carbon fiber mat 30.

On the way to the impregnation machine 151, the first carrier film 41 loaded with the carbon fiber mat 30 deposited on the first resin layer 51 is laminated with the second carrier film 42 with a side having the second resin layer 52 formed thereon facing downward.

The carbon fiber mat 30 is impregnated with the thermosetting resin composition 50 by pressurizing with the impregnation machine 151.

After the impregnation step is completed, the impregnated carbon fiber mat 30 is wound on a bobbin while sandwiched between the first carrier film 41 and the second carrier film 42 and becomes an SMC product through an aging step to be performed when necessary. In the aging step, the thermosetting resin composition 50 becomes highly viscous by an action of the added thickener and is brought into a semi-cured state.

In the SMC manufactured by the SMC manufacturing method of the present embodiment, even when a starting material is the continuous carbon fiber bundle classified as a large tow, the CFRP obtained by curing the same shows a favorable elastic modulus. The favorable elastic modulus here means an elastic modulus equivalent to an elastic modulus of a CFRP obtained by curing an SMC manufactured by using a continuous carbon fiber bundle having a less filament number as a starting material.

In the SMC manufactured by the SMC manufacturing method of the present embodiment, furthermore, when the continuous carbon fiber bundle having a filament number of NK serving as the starting material is partially split into n sub-bundles, the CFRP obtained by curing the same shows high strength. The high strength here means strength equivalent to strength of a CFRP obtained by curing an SMC manufactured by using a continuous carbon fiber bundle having a less filament number as a starting material.

In a preferred embodiment, N/n is 10 or more and 25 or less. For example, this means that n is 2 to 4 when N is 40, n is 2 to 5 when N is 50, and n is 3 to 6 when N is 60. In the preferred embodiment, the number of slit rows that have to be formed in the continuous carbon fiber bundle serving as the starting material is pretty small. This means that not only that the slits are easily formed, but also that the amount of fuzz generated along with the formation of the slits is small. The small amount of fuzz is advantageous in that impregnation defects are less likely to occur, and is also preferable in preventing deterioration of appearance of the CFRP molded from the manufactured SMC.

2. Experimental Results

2.1. Experiment 1

(Preparation of SMC)

An SMC was prepared by using an SMC manufacturing apparatus having a similar configuration as the SMC manufacturing apparatus represented in FIG. 1.

A configuration of a fragmentation-processing apparatus was similar to that included in the SMC manufacturing apparatus represented in FIG. 1. Two pin rollers were both formed of metal and had the same configuration. Diameters and lengths of pins disposed on a cylinder circumferential surface of each pin roller were respectively 3 mm and 20 mm. The disposition of the pins on the cylinder circumferential surface of each pin roller was periodic, and the disposition overlapped the original disposition when shifted by 7.5 mm in the axial direction and 6.5 mm in the circumferential direction. A sum of maximum radii of the two pin rollers was 10 mm larger than a distance between rotation axes of the two pin rollers.

A continuous carbon fiber bundle (TRW40 50 L manufactured by Mitsubishi Chemical Corporation) having the filament number of 50K was dipped in an aqueous dispersion of an epoxy acrylate-based sizing agent, dried, and then used as a carbon fiber raw material. After the sizing process, the content of the sizing agent in the carbon fiber bundle was 1.4 wt %.

A thermosetting resin composition was prepared by blending a thickener, a polymerization inhibitor, a polymerization initiator, and an internal mold release agent with a mixture of a vinyl ester resin, an unsaturated polyester resin, and styrene.

A plurality of the continuous carbon fiber bundles were simultaneously supplied to a rotary cutter in a state of being aligned in parallel at an equal interval, and cut every 25.4 mm (1 inch) to chopped carbon fiber bundles.

The two pin rollers of the fragmentation-processing apparatus were both rotated such that the circumferential speeds at a tip of the pin were 628 m/min. The rotation directions were set to be opposite to each other, and each pin roller was rotated such that its pins moved downward from above on its side facing the other pin roller.

The chopped carbon fiber bundles fragmentation-processed by the fragmentation-processing apparatus were fallen onto a polyethylene carrier film traveling at a linear speed of 5 m/min. The fallen chopped carbon fiber bundles were deposited on the thermosetting resin composition applied to the carrier film in advance in a separate step, thereby forming a carbon fiber mat.

The carrier film loaded with the deposited carbon fiber mat was laminated with another polyethylene carrier film with the same thermosetting resin composition applied to one surface, and thereafter, pressurized with the impregnation machine, so that the carbon fiber mat was impregnated with the thermosetting resin composition.

After the impregnation, the laminate was placed at 23° C. for 168 hours (7 days) to thicken the thermosetting resin composition, thereby completing the SMC. The content of the carbon fiber in the obtained SMC was approximately 53% by weight, and an areal weight of the carbon fiber was approximately 2,000 g/m$^2$.

(Preparation and Evaluation of CFRP Plate)

The obtained SMC was cut into 270 mm×270 mm and cured by using a press molding machine under conditions of a temperature of 140° C., a pressure of 8 MPa, and a pressurization time of 2 minutes, thereby forming a 300 mm square CFRP plate having a thickness of 2 mm.

A bending test piece having a length of 60 mm and a width of 25 mm was cut out from the CFRP plate, and a three-point bending test was performed by using a 5 kN Instron type universal tester at L/D=16 and a crosshead speed of 1.4 mm/min. As a result, bending strength was approximately 310 MPa, and a bending elastic modulus was approximately 26 GPa.

(Evaluation of Carbon Fiber Mat)

In order to examine filament numbers of the chopped carbon fiber bundles included in the SMC prepared as described above, a dry carbon fiber mat was deposited on a carrier film by following a similar procedure except that the thermosetting resin composition was not applied to the carrier film.

A region of approximately 30 cm×30 cm deposited near a center line of the carrier film was selected from the carbon fiber mat, and the filament numbers of all of the chopped carbon fiber bundles (300 pieces or more) having widths of 0.5 mm or more included in the region were examined by conversion from weights. As a result, the content of a component with the filament number of more than 15K was 41% by weight, and the content of a component with the filament number of 1K or less was less than 0.1% by weight.

2.2. Experiment 2

An SMC having the content of carbon fibers of approximately 53% by weight and an areal weight of carbon fibers of approximately 2000 g/m$^2$ was produced in a similar manner to Experiment 1 except that the continuous carbon fiber bundle having a filament number of 50K was used after being widened to an approximate 20 mm width and partially split into four sub-bundles having a width of approximately 5 mm.

Furthermore, a CFPR plate was prepared from the SMC and the bending test was performed.

The partial split was performed by forming three slit rows each with a slit length of 700 mm and an inter-slit gap length of 10 mm in the continuous carbon fiber bundle. Positions of the inter-slit gaps in the fiber direction were the same among the three slit rows.

As a result of the bending test, the bending strength was approximately 370 Mpa, and the bending elastic modulus was approximately 26 GPa.

Furthermore, the dry carbon fiber mat was deposited on the carrier film by following a similar procedure except that the thermosetting resin composition was not applied to the carrier film, and the filament numbers of the chopped carbon fiber bundles included therein was examined in the same manner as that in Experiment 1. As a result, the content of the component with the filament number of more than 15K was 6% by weight, and the content of the component with the filament number of 1K or less was less than 0.1% by weight.

2.3. Experiment 3

An SMC having the content of carbon fibers of approximately 53% by weight and an areal weight of carbon fibers of approximately 2000 g/m² was produced in a similar manner to Experiment 1 except that a continuous carbon fiber bundle having the content of sizing agent of 1.2 wt % and a filament number of 15K (TR50S 15 L manufactured by Mitsubishi Chemical Corporation) was used in place of the continuous carbon fiber bundle having a filament number of 50K, and that the fragmentation-processing apparatus was not used. Furthermore, a CFPR plate was prepared from the SMC and the bending test was performed.

As a result of the bending test, the bending strength was approximately 370 Mpa, and the bending elastic modulus was approximately 26 GPa.

Comparing the CFRPs prepared in Experiments 1 to 3 with each other, whereas the bending elastic moduli were comparable, the bending strengths were not on a level. Specifically, the bending strength of the CFRP prepared in Experiment 1 was lower than that of the CFRP prepared in Experiments 2 and 3. On the other hand, the bending strength of the CFRP prepared in Experiment 2 and the bending strength of the CFRP prepared in Experiment 3 were comparable each other.

Hitherto, the present invention has been described above with reference to specific embodiments. However, each embodiment is presented as an example, and does not limit the scope of the present invention. Each embodiment described in the present specification can be modified in various ways within the scope not departing from the concept of the invention, and can be combined with characteristics described in other embodiments to the extent practicable.

REFERENCE SIGNS LIST

10: Continuous carbon fiber bundle
11: Sub-bundle
20: Chopped carbon fiber bundle
30: Carbon fiber mat
100: SMC manufacturing apparatus
110: First resin application section
120: Second resin application section
130: Chopping section
140: Deposition section
150: Impregnation section
160: Fragmentation-processing apparatus
200 Split device
210: Spread section
220: Split section
410: Rotation axis
412: Disk
414: Wire or rod

The invention claimed is:

1. A manufacturing method of an SMC, comprising:
(i) forming chopped carbon fiber bundles by chopping a continuous carbon fiber bundle having a filament number of NK with a rotary cutter;
(ii) fragmentation-processing the chopped carbon fiber bundles by using a fragmentation-processing apparatus;
(iii) forming a carbon fiber mat by depositing the fragmentation-processed chopped carbon fiber bundles on a carrier film traveling below the rotary cutter; and
(iv) impregnating the carbon fiber mat with a thermosetting resin composition,
wherein N is 20 or more, and
the fragmentation-processing apparatus comprises a first pin roller and a second pin roller which are disposed side by side, each having a rotation axis parallel to a rotation axis direction of the rotary cutter, and
a sum of a maximum radius of the first pin roller and a maximum radius of the second pin roller is equal to or greater than a distance between the rotation axes of the first pin roller and the second pin roller.

2. The manufacturing method according to claim 1, wherein the first pin roller is rotationally driven such that its pins move downward from above on its side facing the second pin roller, and the second pin roller is rotationally driven such that its pins move downward from above on its side facing the first pin roller.

3. The manufacturing method according to claim 1, wherein the sum of the maximum radius of the first pin roller and the maximum radius of the second pin roller is greater than the distance between the rotation axes of the first pin roller and the second pin roller.

4. The manufacturing method according to claim 1, wherein N is 40 or more.

5. The manufacturing method according to claim 1, wherein N is 100 or less.

6. The manufacturing method according to claim 1, wherein the continuous carbon fiber bundle is a continuous carbon fiber bundle partially split into n sub-bundles (where, n is an integer of 2 or more) such that N/n is 10 to 25.

7. The manufacturing method according to claim 6, wherein N/n is 10 to 20.

8. The manufacturing method according to claim 1, wherein a content of a chopped carbon fiber bundle having a filament number of 1K or less in the carbon fiber mat is less than 1% by weight.

9. The manufacturing method according to claim 1, wherein the carbon fiber mat is pressurized together with the thermosetting resin composition to impregnate the carbon fiber mat with the thermosetting resin composition.

10. The manufacturing method according to claim 1, wherein at least a part of the thermosetting resin composition is applied to an upper surface of the carrier film before the carbon fiber mat is formed on the carrier film.

11. A manufacturing method of an SMC, comprising:
(i) forming chopped carbon fiber bundles by chopping a continuous carbon fiber bundle having a filament number of NK with a rotary cutter;
(ii) fragmentation-processing the chopped carbon fiber bundles by using a fragmentation-processing apparatus;
(iii) forming a carbon fiber mat by depositing the fragmentation-processed chopped carbon fiber bundles on a carrier film traveling below the rotary cutter; and
(iv) impregnating the carbon fiber mat with a thermosetting resin composition,
wherein N is 20 or more, and
the fragmentation-processing apparatus comprises a first pin roller and a second pin roller which are disposed side by side, each having a rotation axis parallel to a rotation axis direction of the rotary cutter,
wherein the first pin roller is rotationally driven such that its pins move downward from above on its side facing the second pin roller, and the second pin roller is rotationally driven such that its pins move downward from above on its side facing the first pin roller, and
wherein a sum of a maximum radius of the first pin roller and a maximum radius of the second pin roller is equal to or greater than a distance between the rotation axes of the first pin roller and the second pin roller.

12. The manufacturing method according to claim 11, wherein the sum of the maximum radius of the first pin roller and the maximum radius of the second pin roller is greater than the distance between the rotation axes of the first pin roller and the second pin roller.

13. The manufacturing method according to claim 11, wherein N is 40 or more.

14. The manufacturing method according to claim 11, wherein a content of a chopped carbon fiber bundle having a filament number of 1K or less in the carbon fiber mat is less than 1% by weight.

15. A manufacturing method of an SMC, comprising:
(i) forming chopped carbon fiber bundles by chopping a continuous carbon fiber bundle having a filament number of NK with a rotary cutter;
(ii) fragmentation-processing the chopped carbon fiber bundles by using a fragmentation-processing apparatus;
(iii) forming a carbon fiber mat by depositing the fragmentation-processed chopped carbon fiber bundles on a carrier film traveling below the rotary cutter; and
(iv) impregnating the carbon fiber mat with a thermosetting resin composition,
wherein N is 20 or more, and
the fragmentation-processing apparatus comprises a first pin roller and a second pin roller which are disposed side by side, each having a rotation axis parallel to a rotation axis direction of the rotary cutter,
wherein the first pin roller is rotationally driven such that its pins move downward from above on its side facing the second pin roller, and the second pin roller is rotationally driven such that its pins move downward from above on its side facing the first pin roller,
wherein a sum of a maximum radius of the first pin roller and a maximum radius of the second pin roller is equal to or greater than a distance between the rotation axes of the first pin roller and the second pin roller, and
wherein the continuous carbon fiber bundle is a continuous carbon fiber bundle partially split into n sub-bundles (where, n is an integer of 2 or more) such that N/n is 10 to 25.

16. The manufacturing method according to claim 15, wherein the sum of the maximum radius of the first pin roller and the maximum radius of the second pin roller is greater than the distance between the rotation axes of the first pin roller and the second pin roller.

17. The manufacturing method according to claim 15, wherein N is 40 or more.

18. The manufacturing method according to claim 15, wherein a content of a chopped carbon fiber bundle having a filament number of 1K or less in the carbon fiber mat is less than 1% by weight.

* * * * *